July 28, 1931.   F. HAEGERMANN   1,816,114
PRIZE TROPHY
Filed Nov. 12, 1928

F. Haegermann
INVENTOR

By Marks & Clerk
ATTYS.

Patented July 28, 1931

1,816,114

UNITED STATES PATENT OFFICE

FRIEDRICH HAEGERMANN, OF PEINE, GERMANY

PRIZE TROPHY

Application filed November 12, 1928, Serial No. 318,863, and in Germany January 26, 1928.

Metal wreaths consisting of a wire ring with sockets, into which the artificial leaves are inserted with their wire stems, being fixed in position by wrapping the wire ring and the wire stems, are known.

The present invention relates to a prize trophy of metal consisting of a branch and separate leaves, each to be used as a prize, which are capable of being inserted in a known manner in sockets on the branch. Several branches can be put together to form a wreath, without any further auxiliary means being required.

Figure 1:
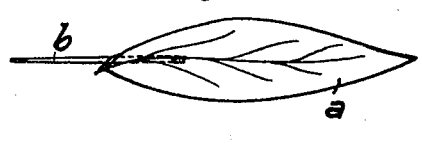
Figure 1A:
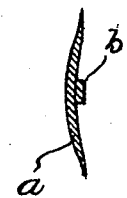
Figure 2:
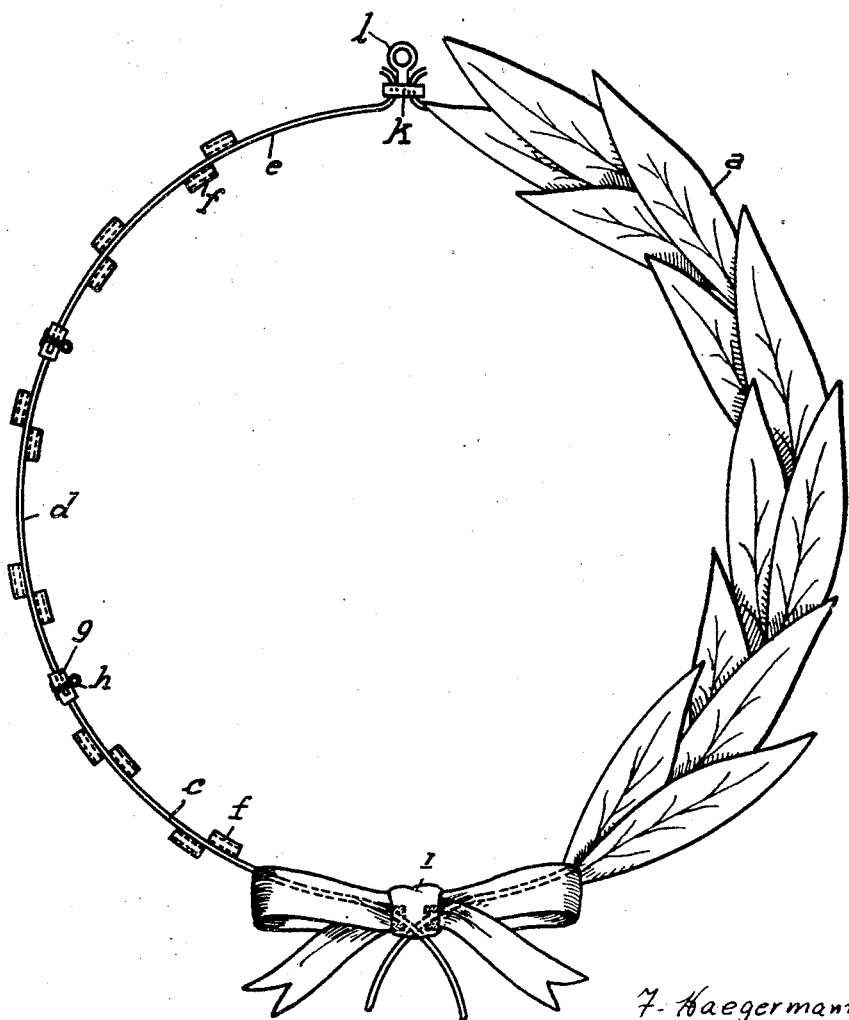

A constructional example of the invention is shown in the accompanying drawings in which Fig. 1 represents a single leaf, Fig. 1a a cross-section through the leaf, and Fig. 2 the wreath partly set with leaves.

$a$ is a leaf of any form made of noble or base metal (e. g. gold or copper) and having a wire $b$ of quadrangular cross-section fixed to it, which serves the purpose of a pin, when the single leaf is worn by the victor. The leaves may be put together to form branches and the latter may be assembled to form a wreath. The wreath consists of two main branches, each of which is composed of three parts $c$, $d$, $e$. Each part of a branch has four sockets $f$, each of which can have a leaf inserted into it. The hole in the socket is made angular to fit the stem of the leaf. All that is required is to insert the quadrangular wire $b$ of the leaf into the similarly shaped socket and to bend it over somewhat. The leaf will then be quite firm, more particularly will not be able to twist out of its display position. Such a part branch with four leaves will even by itself form a nice memento.

The separate part branches may be joined together in any suitable manner, for instance by one part branch being provided at one end with a sleeve $g$, into which the end of the second part branch can be inserted and fixed in position by a split pin $h$.

Two main branches having thus each been formed of three part branches, they are put together to form a wreath by being for instance held together at the bottom by a metal bow $i$ and at the top by a collar $k$ with a suspending eye $l$. The bow may be fixed to the branches by means of screws.

Any number of leaves and of part branches may of course be put together. The part branch $c$ may for instance have five leaves, the part branch $d$ four leaves and the part branch $e$ three leaves. The fixing of the leaves to the branches and of the branches to one another may also be effected in any other suitable manner.

What I claim is:

A prize trophy comprising the combination with a metal branch having sockets thereon, of separate metal leaves, attaching means on each of said leaves for attachment to the person so that they may be worn separately as awards for individual successes, said attaching means being also detachably engaged in said sockets on the branch in order to form a collective award, as and for the purpose set forth.

In testimony whereof I have signed my name to this specification.

FRIEDRICH HAEGERMANN.